United States Patent Office 3,285,949
Patented Nov. 15, 1966

3,285,949
CARBOXYL - TERMINATED BUTADIENE POLYMERS PREPARED IN TERTIARY BUTANOL WITH BIS-AZOCYANO ACID INITIATION
Alan R. Siebert, Maple Heights, Ohio, assignor to The B. F. Goodrich Company, New York, N.Y., a corporation of New York
No Drawing. Filed Apr. 17, 1964, Ser. No. 360,752
3 Claims. (Cl. 260—465.4)

This invention relates to the production of liquid, carboxyl-terminated polymers, and more particularly relates to the use of a certain class of catalysts in combination with a particular solvent for the production of difunctional carboxyl-terminated butadiene polymers.

It is known in the art, as shown in German Patent 1,150,205, that carboxyl-terminated polybutadiene can be prepared in the presence of both end group-introducing initiators and modifiers with a bis-type structure in methanol and non-alcoholic solvents such as acetone.

The advantage of producing a liquid, low molecular weight, dicarboxyl-terminated polybutadiene addition polymer in which the molecules have terminal reactive groups is that we then have a material which is pourable and castable at room temperature and which by virtue of its reactive functional chain ends can be further polymerized at room temperature by the addition of known curing agents such as diisocyanates, metal oxides, polyamines, imides and the like to form solid, high molecular weight materials of low fusibility. These liquid polymers can be used as fuel binders, for impregnation, for potting and encapsulation and the like. The carboxyl bifunctionality is essential if higher polymers are to be produced by the subsequent curing reactions. In addition to their unique curing properties, these butadiene polymers also have essentially the properties of butadiene polymerizates that do not have functional end groups.

The use of both initiators and modifiers of the bis-type structure as taught in the art means that separate material handlings must be made for each polymerization charge and leads to polymers containing varying amounts of sulfur in the polymer chains as the usage of modifier in the polymerization is somewhat random in nature. It is desirable to avoid using said modifiers, but if the procedure of German Patent 1,150,205 is followed merely omitting the modifier, it is found that difunctional, carboxyl-termination is not obtained. The growing polymer chains may be carboxyl-terminated at one end, but the second reactive end tends to take up hydrogen from the methanol or acetone solvent and becomes hydrogen terminated. This results in a low degree of difunctionality or condensation polymerization. Polymers of this type with lower degrees of difunctionality generally have poorer physical properties than polymers whose degree of difunctionality is closer to 2. When liquid copolymers of butadiene are prepared in systems of this type, the amount of reactive chain termination is even lower than that found when butadiene is used as the only monomer. It will be of value to the art if liquid butadiene copolymers can be prepared with a functionality close to 2.

It is an object of this invention to provide a novel process for the manufacture of liquid rubbers derived from butadiene polymers.

A further object of the invention is to provide uniform, liquid, carboxyl-terminated, difunctional butadiene polymers derived from a solvent polymerization system without employing a bis-thio modifier.

My invention is accomplished by preparing liquid polymerization products of butadiene in a particular solvent which has a low chain transfer potential, namely tertiary butanol, and employing a bis-azocyano acid initiator of the formula

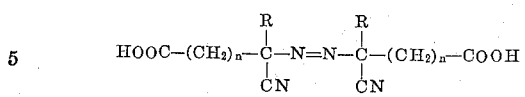

wherein R is an alkyl group of 1–3 carbon atoms, and $n$ is an integer from 1–6. Said materials are prepared by reacting gamma, delta, epsilon, zeta, eta, theta, iota and kappa-keto acids of the formula

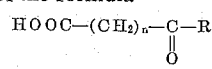

where $n$ and R are defined as above, with hydrazine sulfate and sodium cyanide. The carbonyl oxygen of the keto acid is converted first to hydroxyl, then to a cyano group. Two units of the converted acid are linked to each hydrazine unit and a final oxidation with chlorine converts the hydrazine unit to a double bond azo linkage. Preferred materials of this class include azodicyanobutyric acid, azodicyanovaleric acid, azodicyanopelargonic acid, azodicyanoundecylic acid and the like. No dithio modifiers are required in the practice of my invention.

A critical part of my invention in producing difunctional, carboxyl-terminated polybutadienes is the selection of a solvent for the polymerization system that will have a very low chain transfer constant. The free radical-growing end of a vinyl polymer chain molecule bears an odd electron and is a center of high reactivity. It can add monomer molecules and can attack the solvent, removing therefrom an atom such as hydrogen to satisfy the free valence. When this attack or chain transfer from the solvent occurs, the particular polymer chain end becomes hydrogen-terminated. Each monomer growing chain or macroradical has its own characteristic degree of chain transfer for each different solvent. For example, carbon tetrachloride, $CCl_4$, is a highly reactive transfer agent for styrene, but is inferior to ketones for vinyl chloride and has little effect on acrylic acid or acrylonitrile. The chain transfer potential of a given solvent for a given monomer system is not predictable. Thus, it was surprising to discover that tertiary butanol, alone among many alcoholic and non-alcoholic solvent systems studied, has an extremely low chain transfer potential for butadiene monomer systems and enables one to produce low molecular weight (from about 500 to about 20,000), polybutadienes with carboxyl-termination at each end of the polymer chain when a particular bis-azo type of catalyst is employed as the polymerization initiator.

When butadiene monomer is polymerized in tertiary-butanol using azodicyanovaleric acid as the initiator at 70°–80° C. and the polymerization is allowed to run until the initiator is about 75 percent decomposed, as determined from its half-life at the particular temperature, Lewis and Matheson, JACS, 71, 747 (1949), excess butadiene can be vented and the liquid polymer thrown down with methanol. After settling, the methanol-tertiary butanol layer can be decanted. The liquid polymer may be represented by the structure

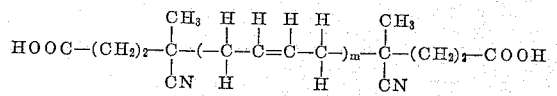

where $m$ is an integer from 93–130. The initiator, azodicyanovaleric acid,

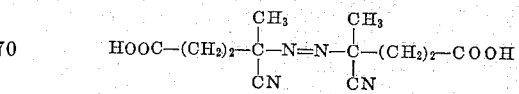

decomposes to form $N_2$ gas and the free radicals,

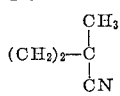

which react with each end of the growing polymer chain to form difunctional, carboxyl-terminated polymer. The action of this type of initiator is likely due to the fact that the tertiary carbon-nitrogen bond is readily dissociated—as by thermal means. Carbon-sulfur bonds, such as are found in dithio type modifiers require greater energy to dissociate them. This process leads to difunctional, carboxyl-terminated polymers with excellent reproducibility and freedom from contamination by emulsifiers and salts. These polymers may be represented by the formula

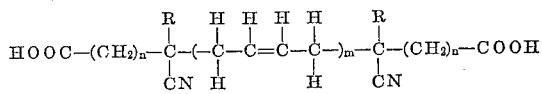

where R, $m$ and $n$ have the significance set forth above.

In addition to forming difunctional polymers of butadiene alone, this process is applicable to liquid butadiene:acrylonitrile polymers. Efforts to produce liquid butadiene:styrene copolymers with a functionality of 2 have failed, a further indication of the unique effect of using the specific polymer solvent tertiary-butanol. It is important to the process of this invention that the monomers be polymerized in tertiary butanol solvent and that an azodicyano acid type catalyst, which has tertiary carbon atoms connected to the N atoms of the azo coupling and dissociates to form carboxyl-terminated free radicals, be used. The catalyst may be added entirely in the initial charge, but preferably is added continuously as the polymerization proceeds.

The polymers are found to be curable with isocyanates, imides, ethylene oxide and similar materials to give excellent physical properties. They cure at room temperature to give strong, tack-free materials. They can be reinforced with whiting, carbon black and other pigments.

Molecular weights of the polymers are determined with a Mechrolab Vapor Pressure Osmometer using methyl ethyl ketone (MEK) as the solvent. The insrument is calibrated with azobenzene and sucrose octa-acetate. Molecular weight may also be calculated from the chemical equivalents per hundred of rubber of carboxyl (ephr.) value determined by titration of polymer solution with alcoholic KOH to a phenolphthalein endpoint. Functionality of the polymer is defined as the ratio of the osmometer molecular weight (corrected for antioxidant, if any is present) to the calculated ephr. molecular weight times 2 or the number of carboxy groups per molecule.

Brookfield viscosity, employing an LTV model viscometer and a #4 spindle is run on the freshly prepared polymers. Values up to 50,000–60,000 cps. are accepted by the art as indicative of pourable, easily handled materials.

The bis-azo acid initiators employed are readily prepared by reacting a neutralized keton acid with sodium cyanide and hydrazine sulfate under strong agitation. When this reaction is complete, chlorine gas is added to perform the oxidation. A light tan solid forms which filtered and vacuum dried (J. Chem. Soc., 4256 (1955), Trans. Far. Soc., 56, 934 (1960)). An alternative method for preparing these aliphatic azo dicarboxylates, in which the carbons attached to the azo group are tertiary, is set forth in United States Patent 2,469,358.

As the method of this invention employs a solvent polymerization system, it is important that the solvent selected, tertiary butanol, not only have the critical low chain transfer constant with respect to the butadiene monomers employed, but it must also be sufficiently polar to dissolve the bis-azo initiators used. Azodicyanovaleric acid, for instance, is insoluble in toluene, benzene, carbon tetrachloride, chloroform and non-polar solvents. Hence it is surprising to find that tertiary butanol has the necessary properties to serve successfully as the solvent in this polymerization system.

*Example 1*

A bottle polymerization of butadiene in tertiary butanol is conducted using azodicyanovaleric acid catalyst. When the catalyst is about 75% decomposed, the excess butadiene is vented and the bottle contents are added to methanol with stirring to throw down the liquid polymer. After settling, the methanol-tertiary butanol layer is decanted. One part phenylbetanaphthylamine antioxidant is added to the polymer per 100 parts of polymer which is then dried in a Rinco evaporator to constant weight. The polymer is cured with a difunctional epoxy resin having an equivalent weight of 195 (Epon 828). Polymer and curing agent are mixed at 80° C. under vacuum and poured into a mold. The sample is cured at 80° C. for 24 hours and aged two days at room temperature. Polymerization data are set forth in Table 1.

TABLE I

| | | |
|---|---|---|
| Tertiary butanol | parts | 100 |
| Butadiene | do | 100 |
| Catalyst | do | 4 |
| Temperature | °C | 70 |
| Polymerization time | hrs | 16 |
| Polymer yield | g | 14.8 |
| Ephr. | | .058 |
| Brookfield viscosity R.T. | cps | 21,300 |
| $\overline{M}n$—MEK | | 3,590 |
| $\overline{M}n$—calc. | | 3,520 |
| Functionality | | 2.04 |

Five grams of polymer are combined with 1.1 equivalents of epoxy resin for the cure. The cured polymer develops a tensile strength of 250 p.s.i. and 570% elongation at break.

The polymer is separately cured with one equivalent of trifunctional aziridinyl phosphine oxide at 80° C. for 24 hours and aged two days at room temperature. The tensile strength developed is 146 lbs. per sq. in. and the elongation at break is 210%.

*Example II*

The procedure of Example I is repeated except that catalyst is proportioned continuously into the polymerization vessel. The catalyst is added in the form of a 10 weight percent solution in tertiary butanol.

TABLE 2

| | | |
|---|---|---|
| Tertiary butanol | parts | 100 |
| Butadiene | do | 100 |
| Catalyst—initial | do | 1.2 |
| Catalyst—total | do | 8.0 |
| Polymerization vessel, glass | gal | 15 |
| Polymerization temperature | °C | 80 |
| Polymerization time | hrs | 32 |
| Ephr. | | 0.0445 |
| $\overline{M}n$—MEK | | 4,450 |
| $\overline{M}n$—calc. | | 4,500 |
| Functionality | | 1.98 |
| Brookfield viscosity at 27° C. | cps | 28,000 |

Five grams of polymer are combined with 1.3 equivalents of epoxy resin and heated to 80° C. for 24 hours for the cure. The cured polymer develops a tensile strength of 450 p.s.i. and 670% elongation at break.

*Examples III–VI*

For comparison with the difunctional polymer produced by the method of my invention in Example I, liquid polybutadiene polymers are prepared by the procedure of German Patent 1,150,205. Example III follows the teaching of the patent, employing both the carboxylic azo acid initiator and the carboxylic acid modifier; Example IV shows the results when the unique modifier employed by the patentees is omitted from the system without changing the polymerization solvent from methanol to tertiary butanol as is done in the method of my invention. Example V illustrates substitution of tertiary butanol for methanol and dropping of the modifier; Example VI illustrates use of 100% tertiary butanol as the solvent medium.

The polymerizations are run in bottle polymerizers for 16 hours at 70° C. Ingredients and functionality data are tabulated in Table 3.

TABLE 3

|  | Ex. III | Ex. IV | Ex. V | Ex. VI |
|---|---|---|---|---|
| Water, parts | 20 | 20 | 20 | |
| Methanol, parts | 80 | 80 | | |
| Tertiary butanol, parts | | | 80 | 100 |
| Butadiene, parts | 100 | 100 | 100 | 100 |
| Azodicyanovaleric acid, parts | 4 | 4 | 4 | 4 |
| Dithiodiglycollic acid, parts | 7.3 | | | |
| Weight, polymer, grams | 18.65 | 18.45 | 16.2 | 16.3 |
| Ephr | 0.068 | 0.070 | 0.0495 | 0.0589 |
| $\overline{M}n$—MEK | 2,430 | 2,130 | 4,550 | 3,590 |
| $\overline{M}n$—calc | 2,940 | 2,860 | 4,040 | 3,400 |
| Functionality | 1.64 | 1.48 | 2.25 | 2.10 |

It is apparent that the functionality of liquid polybutadienes prepared in solvent other than tertiary butanol, either with or without a bis-type modifier in addition to the bis-type initator, is far below the desired level of two. On the other hand, when tertiary butanol as called for in the invention, is substituted for methanol as the polymerization solvent, whether or not it is diluted with water as taught by the prior art, polybutadiene with carboxyl-termination at each end of the chain is readily achieved, even in the absence of the carboxylic acid modifier whose use is taught by the prior art.

I claim:
1. The method of producing polybutadiene homopolymer having functional carboxyl termination at each end of the polymer chain which comprises solvent polymerizing butadiene monomer using as an initiator an aliphatic azodicarboxylate in which the carbons attached to the azo group are tertiary, represented by the formula

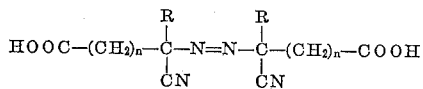

where $n$ is an integer from 1 to 6 and R is an alkyl group containing from 1 to 3 carbon atoms and wherein the solvent employed is tertiary butanol.

2. The method of claim 1 in which the initiator is azodicyanovaleric acid.

3. The method of producing polybutadiene homopolymer having carboxyl termination at each end of the polymer chain which comprises solvent polymerizing butadiene monomer in tertiary butanol using as an initiator a carboxyl terminated material represented by the formula

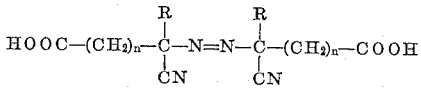

where $n$ is an integer from 1 to 6 and R is an alkyl group containing from 1 to 3 carbon atoms, said initiator dissociating into nitrogen gas and free radicals represented by the formula

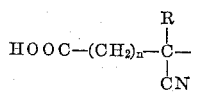

where R and $n$ have the significance previously set forth, said free radicals combining with free ends of growing butadiene polymer chain at the rate of one free radical per polymer chain end, forming a polybutadiene represented by the formula

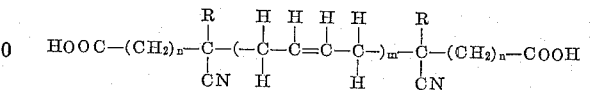

where R and $n$ have the significance set forth and $m$ is an integer from 93–130.

References Cited by the Examiner
UNITED STATES PATENTS
2,744,105  5/1956  Barney _____ 260—404.5

FOREIGN PATENTS
1,150,205  1/1964  Germany.

CHARLES B. PARKER, *Primary Examiner.*
JOSEPH P. BRUST, *Examiner.*